(12) United States Patent
Mimran

(10) Patent No.: US 7,053,866 B1
(45) Date of Patent: May 30, 2006

(54) PORTABLE ADAPTOR AND SOFTWARE FOR USE WITH A HEADS-UP DISPLAY UNIT

(76) Inventor: Emile Mimran, 1304 Roller Rd., Ocean, NJ (US) 07712

( * ) Notice: Subject to any disclaimer, the term of this patent is extended or adjusted under 35 U.S.C. 154(b) by 0 days.

(21) Appl. No.: 11/016,195

(22) Filed: Dec. 18, 2004

(51) Int. Cl.
G09G 5/00 (2006.01)
G02B 27/14 (2006.01)

(52) U.S. Cl. .......................................... 345/8; 359/630
(58) Field of Classification Search ................ 359/630; 345/7, 8
See application file for complete search history.

(56) References Cited

U.S. PATENT DOCUMENTS

| | | | |
|---|---|---|---|
| 5,784,036 A * | 7/1998 | Higuchi et al. ................ | 345/7 |
| 6,525,768 B1 | 2/2003 | Obradovich et al. | |
| 6,529,824 B1 | 3/2003 | Obradovich et al. | |
| 6,633,267 B1 * | 10/2003 | Numa ............................ | 345/7 |
| 6,654,070 B1 | 11/2003 | Rofe | |
| 6,721,633 B1 | 4/2004 | Funk et al. | |
| 2003/0073406 A1 | 4/2003 | Benjamin et al. | |
| 2003/0160736 A1 | 8/2003 | Fasco et al. | |
| 2005/0062848 A1 * | 3/2005 | Satou .......................... | 348/115 |
| 2006/0012884 A1 * | 1/2006 | Snorteland et al. ......... | 359/630 |

* cited by examiner

Primary Examiner—Loha Ben
Assistant Examiner—Jack Dinh
(74) Attorney, Agent, or Firm—Ezra Sutton, Esq.

(57) ABSTRACT

A heads-up display (HUD) adaptor for use in combination with an existing heads-up display (HUD) unit, wherein the HUD adaptor receives an electronic peripheral device in order to display electronic data and information from the peripheral on the screen of the existing HUD unit on a vehicle's windshield. The HUD adaptor includes a proximal end, a distal end and a cable therebetween; wherein the proximal end has a first adaptor plug; and the distal end has a second adaptor plug. The existing HUD unit includes a heads-up display screen on a front windshield of the vehicle and a heads-up display control unit is positioned within a control panel on a steering wheel of the vehicle for controlling each of the electronic peripherals. The HUD unit includes a USB panel member having a plurality of USB receiving ports for receiving one or more of the HUD adaptors therein. The first adaptor plug of the HUD adaptor is received within a receiving port of an electronic communication device; and the second adaptor plug of the HUD adaptor is received within one of the plurality of USB receiving ports of the USB panel member for electronically connecting the HUD adaptor to the HUD control unit.

9 Claims, 5 Drawing Sheets

PORTABLE ADAPTOR AND SOFTWARE FOR USE WITH A HEADS-UP DISPLAY UNIT

FIELD OF THE INVENTION

The present invention relates to adapting existing or additional vehicle computer hardware and software to be used in combination with existing vehicle heads-up display (HUD) units. Such a system may be used with cell phones, personal digital assistant (PDA) units, and other peripherals, in moving vehicles. More particularly, existing HUD units are adapted by the present invention to project the screens of cell phones or PDAs or other peripherals on a vehicle's windshield such that the driver can quickly and safely access a list of cell phone calls or emails or other information while keeping both hands on the steering wheel of the vehicle while driving. The present invention provides a portable HUD adaptor and software for use with the vehicle's existing HUD unit.

BACKGROUND OF THE INVENTION

Information retrieval when driving is very useful and is needed. Vehicular drivers want to be well informed with regard to their travel destination, weather conditions, road conditions, and other data. Thus, drivers need to rely on their cell phones, PDA's, beepers, hand-held GPS satellite receivers, radios and laptop computers, fixed or hand-held, from which they can access and relay pertinent data.

There remains a need for existing heads-up display (HUD) units to be used with various peripherals, including cell phones, PDA's, GPS satellite receivers, computers and other electronic products to project the screens of the cell phones, PDA's and computers to receive and relay data, emails, or computer information on a vehicle's windshield. In this manner, the driver can quickly and safely access and relay information or data from any peripherals, including cell phone calls, emails, map directions, destination data and the like, while keeping both hands on the steering wheel of the vehicle while driving. More particularly, the existing HUD unit should have one or more heads-up display (HUD) adaptor units for use with a variety of electronic peripherals, such as a cell phone, a GPS satellite receiver, or a laptop computer.

DESCRIPTION OF THE PRIOR ART

Display systems for moving vehicles and the like having various designs and configurations have been disclosed in the prior art. For example, U.S. Pat. No. 6,525,768 to OBRADOVICH discloses a positioned camera and GPS data interchange device. This device is a personal communication device with electromagnetic communication capability that includes a GPS receiver and screen. This prior art patent does not disclose the design, configuration and structure of an existing heads-up display (HUD) unit for use with a portable HUD adaptor of the present invention.

U.S. Pat. No. 6,529,824 to OBRADOVICH discloses a personal communication system for communicating voice data positioning information. This system provides for the retrieval of GPS satellite information of position related data by using searching and sorting schemes to interrogate data bases which then automatically transmits the data to the PCD device and display screen. This prior art patent does not disclose the design, configuration and structure of an existing heads-up display (HUD) unit for use with a portable HUD adaptor of the present invention.

None of the prior art patents disclose a heads-up display unit for use with a portable HUD adaptor for receiving a cell phone, PDA, computer or other electronic peripherals for displaying a cell phone message or other information on a screen on the vehicle's windshield.

Accordingly, it is an object of the present invention to provide a portable heads-up display adaptor for use in conjunction with an existing vehicle heads-up display (HUD) unit, wherein the adaptor has plugged into it a cell phone, PDA, computer or other peripherals for displaying and relaying a cell phone message or other information on a screen on the vehicle's windshield, such that the driver may quickly and safely access and relay the information while the driver is able to keep both hands on the steering wheel of the vehicle while driving using the portable HUD adaptor and software with the vehicle's existing HUD unit.

Another object of the present invention is to provide a HUD adaptor for use in conjunction with various peripherals such as an iPod, a laptop/hand held computer, a cell phone, a palm pilot, a PDA, a GPS satellite receiver, a CD player, a portable TV, a VCR player, a DVD player, a car radio, temperature controls, a printer, a recording device, a satellite radio, a beeper or other communication/electronic devices and the like.

Another object of the present invention is to provide a HUD adaptor that is capable of receiving and transmitting the data required from each of the electronic peripherals to the existing HUD unit and displaying the required information on the existing HUD screen on the vehicle's windshield using a HUD control unit on the steering wheel of the user's vehicle.

Another object of the present invention is to provide a HUD adaptor when in operational use is able to integrate portable peripherals to a vehicle.

Another object of the present invention is to provide a HUD adaptor that allows the replacement of many existing buttons in a vehicle and combining the controls on to a control pad and HUD system.

Another object of the present invention is to provide a HUD adaptor that allows for the elimination of bulky electronics and which allows for the replacement of inexpensive electronics within the computer processing board.

Another object of the present invention is to provide a HUD adaptor that will cause less accidents and lower insurance costs.

Another object of the present invention is to provide a HUD adaptor for use in combination with an existing HUD unit that can be mass produced in an automated and economical manner and is readily affordable by the user.

SUMMARY OF THE INVENTION

In accordance with the present invention, there is provided a heads-up display (HUD) adaptor 10 for use in combination with an existing heads-up display (HUD) unit 20, wherein the HUD adaptor receives an electronic peripheral, such as a cell phone 40, in order to display electronic data and information from the peripheral on the screen 24 of the existing HUD unit 20 on the vehicle's windshield 14. The HUD adaptor 10 includes a proximal end 52, a distal end 54, and a cable 56 therebetween; wherein the proximal end has a first adaptor plug 58; and the distal end has a second adaptor plug 62. A heads-up display control unit 26 is positioned within a control panel 28 on a steering wheel 15 of the vehicle 12 for controlling each of the electronic peripherals, such as cell phone 40. The HUD unit 20 further includes a USB panel member 30 having a plurality of USB receiving ports 32a, 32b, 32c and 32d for receiving one or more of the HUD adaptors 10 therein. The first adaptor plug 58 of the HUD adaptor is received within a receiving port 60 of an electronic peripheral, such as cell phone 40; and the second adaptor plug 62 of the HUD adaptor is received within one of the plurality of the USB receiving ports 32a to 32d of the USB panel member 30 for electronically connecting the HUD adaptor 10 to the HUD control unit 26.

BRIEF DESCRIPTION OF DRAWINGS

Further objects, features and advantages of the present invention will become apparent upon the consideration of the following detailed description of the presently preferred embodiment when taken in conjunction with the accompanying drawings, wherein.

DETAILED DESCRIPTION OF THE PREFERRED EMBODIMENT

Figure 1:
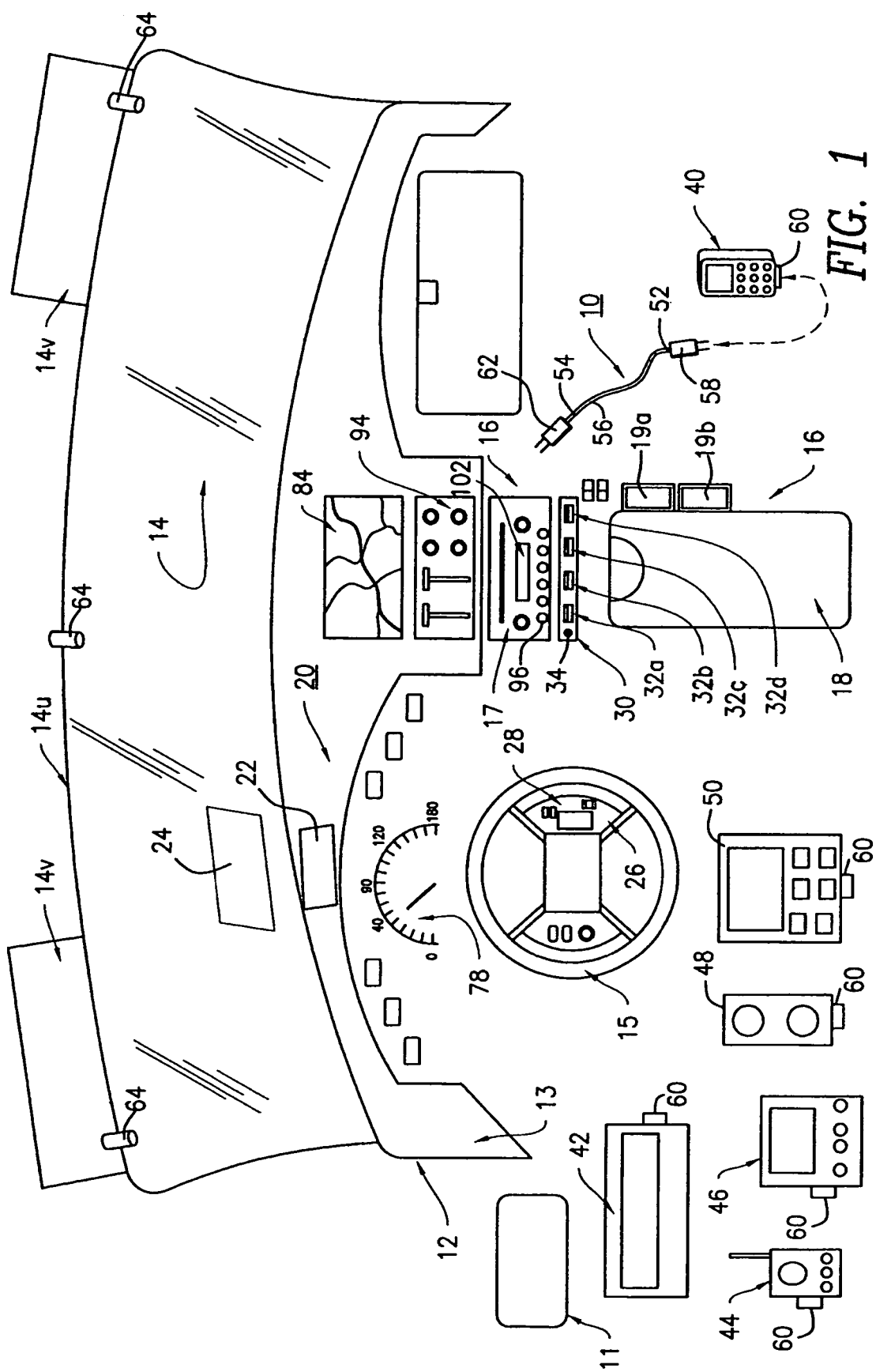
FIG. 1 is a front view of the heads-up display adaptor unit of the preferred embodiment of the present invention showing an interior view of a vehicle's dashboard, arm rest and windshield for use with a heads-up display unit and the HUD adaptor unit.

The portable heads-up display (HUD) adaptor unit 10 of the preferred embodiment of the present invention is represented in detail by FIGS. 1 through 5 of the patent drawings. The HUD adaptor unit 10 is used in conjunction with an existing heads-up display unit 20 and an internal vehicle computer 11 in a moving vehicle 12, as shown in FIG. 1.

A "vehicle" is defined as any type of transportation means including a car, a jeep, an SUV, an RV, a pickup truck, a truck, a bus, a motor boat, a sailboat, a plane, a military transport, a snow mobile, motorcycles, and the like.

A "processor" is defined as the vehicle's, existent or new, computer-processor 11 which is dedicated to the running of all peripherals for vehicle 12.

A "port" is defined as an electronic connection made by hard-internal wiring or soft-external wiring in the form of USB, phone, wireless, and the like connections.

A "peripheral" is defined as any electronic equipment, product or device that is seen or hidden, used and in need by an operator. The peripherals are attached to the receiving port (hard and soft) which are then connected to the processor. The peripherals are controlled by the control pad via the processor. Actions made by the operator using the control pad are transmitted to the processor which communicate with the peripherals and reflect the actions of the operator onto the HUD. A list of electronic equipment is as follows, cell phones, PUD, Palm pilot organizers, Global Positioning System (GPS), Ipod, radio, satellite radio, tape player, CD player, DVD player, laptop, printer, fax machine, digital camera, beepers, cruise control, side mirrors control, seat control, seat memory control, garage doors opener, recoding devices, climate controls, climate hover controls, internal security, alarms, tracking system, vehicle gage controls, door controls, window controls, defrost controls, interactive games, and other communication devices fixed or portable.

A "control pad (with controls)" is defined as a control positioned on a steering wheel, dashboard or arm rest that will control all of the peripherals. This control pad can be a combination of keys, buttons, switches, joy sticks, or a touch pad. The control pad can be fixed, retractable, movable, or wireless. An optional additional key control pad is available on the front passenger side either on the dashboard, front panel, armrest or center console with certain restrictions.

A "HUD" is defined as the heads up display that will project all the information that the peripherals will transmit via the processor. This display will be on the driver's side with an optional display on the front passenger side (with certain restrictions).

The heads-up display unit 20 includes a heads-up display projector 22 positioned on a dashboard 13 of vehicle 12, a heads-up display screen 24 on a front windshield 14 of vehicle 12, and a heads-up display control panel member 26 positioned within a compartment 28 on a steering wheel 15 of vehicle 12. The heads-up display unit 20 also includes a USB panel member 30 having a plurality of USB receiving ports 32a to 32d for receiving one or more of the heads-up display adaptor units 10A, 10B 10C and/or 10D therein; and a head-set jack receiving port 34 for receiving a head-set jack cable 36 of a head set 38 therein. The USB panel member 30 is positioned within a center console area 16 of vehicle 12 and adjacent to the vehicle's radio 17 and arm rest 18. Arm rest 18 includes a pair of cradle holder members 19a and 19b for holding and storing various peripherals and electronic products such as a cell phone 40, a hand held computer 42, an iPod (Interface Protocol Option Device) 44, a portable television set 46, a palm pilot 48, a PDA 50 and the like. It should be understood that the HUD control panel member 26 can also be positioned on the dashboard 13 or arm rest 18 of vehicle 12. Additionally, the visors 14v on the upper section 14u of the front windshield 14 can include microphones 64 in order to pick up the user's voice when using a cell phone 40.

Figure 4:
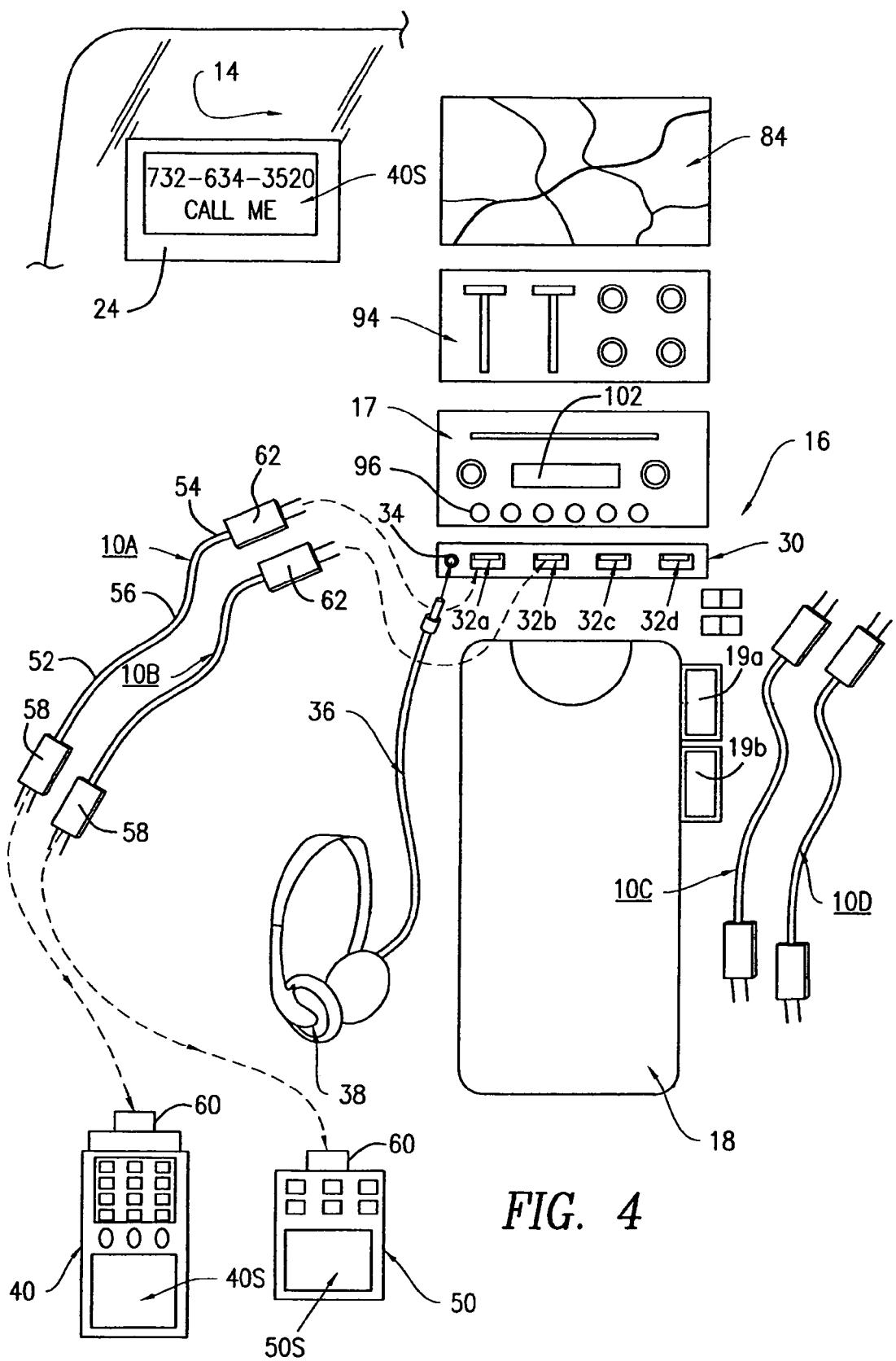
FIG. 4 is an exploded front view of the heads-up display adaptor unit of the present invention showing a front console area having a radio, USB ports, a head set jack port, power control bottoms and a plurality of HUD adaptor units, as well as an arm rest having a pair of cradle members attached thereto.
Figure 5:
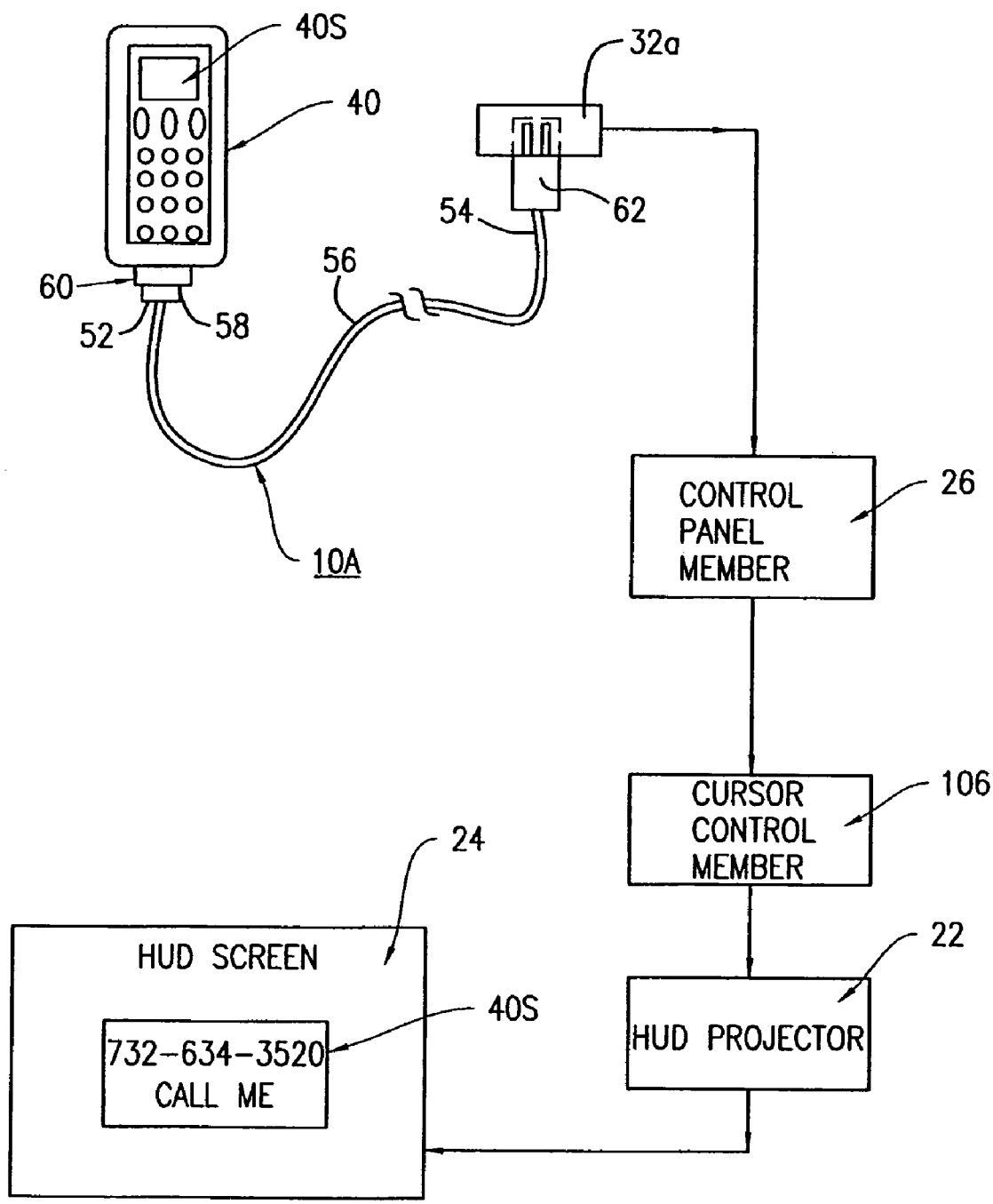
FIG. 5 is a schematic representation of the heads-up display adaptor unit of the present invention showing the electrical connections for a heads-up display of a cell phone screen on the vehicle's windshield.

Each of the heads-up display adaptor units 10A, 10B, 10C and 10D include a proximal end 52, a distal end 54, and a cable/cord 56 therebetween. The proximal end 52 of the HUD adaptor unit 10 includes a first adaptor plug 58. The first adaptor plug 58 is received within an electrical product receiving port 60 for an electronic product such as cell phone 40. The distal end 54 of the HUD adaptor unit 10 includes a second adaptor plug 62. The second adaptor plug 62 is received within one of the plurality of the USB receiving ports 32a to 32d of the USB panel member 30, as shown in FIGS. 1, 4 and 5 of the drawings.

Figure 2:
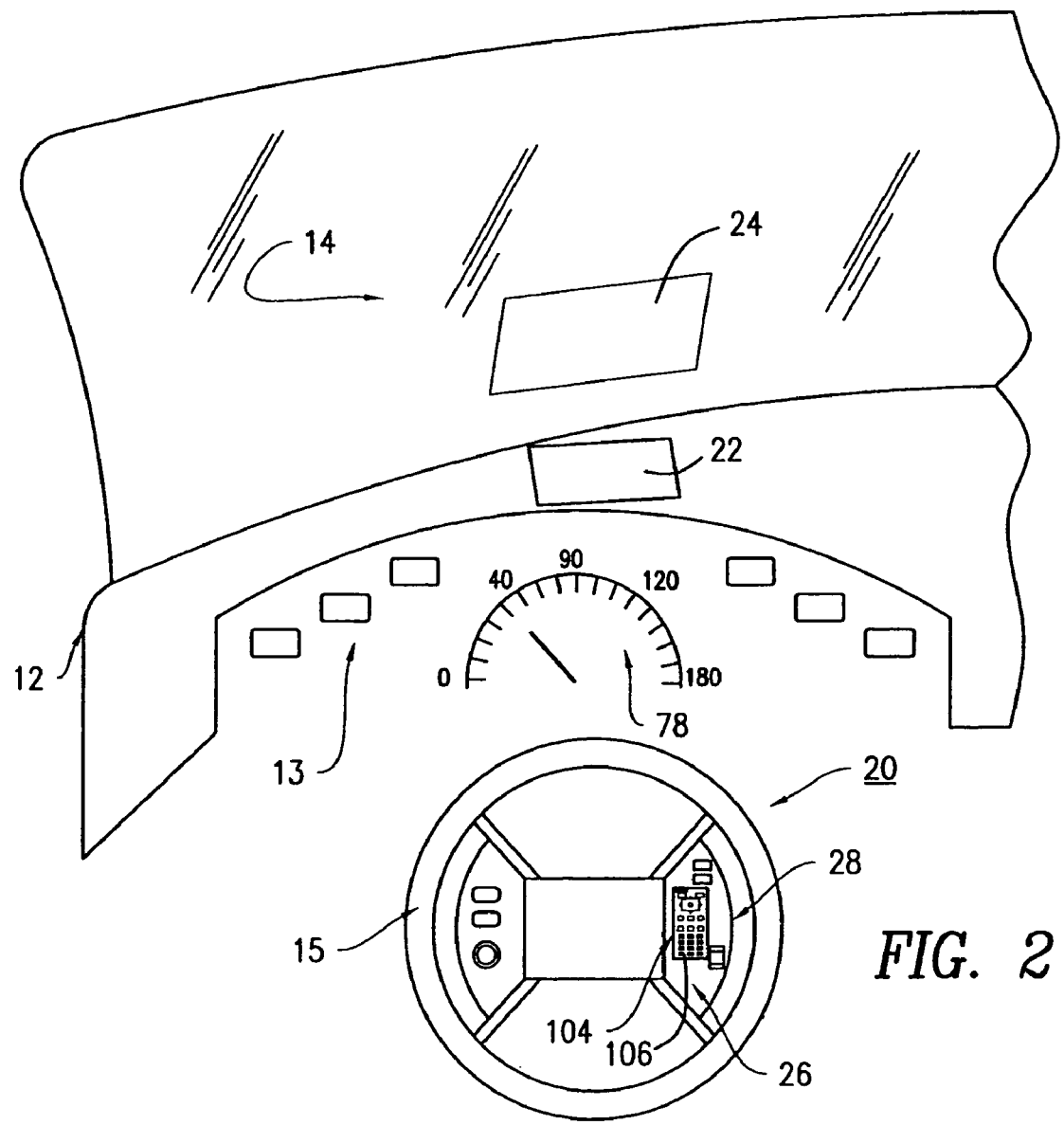
FIG. 2 is a front view of the heads-up display adaptor unit of the present invention showing a vehicle's steering wheel having radio controls, cruise controls, an air bag and a heads-up display control member.
Figure 3:
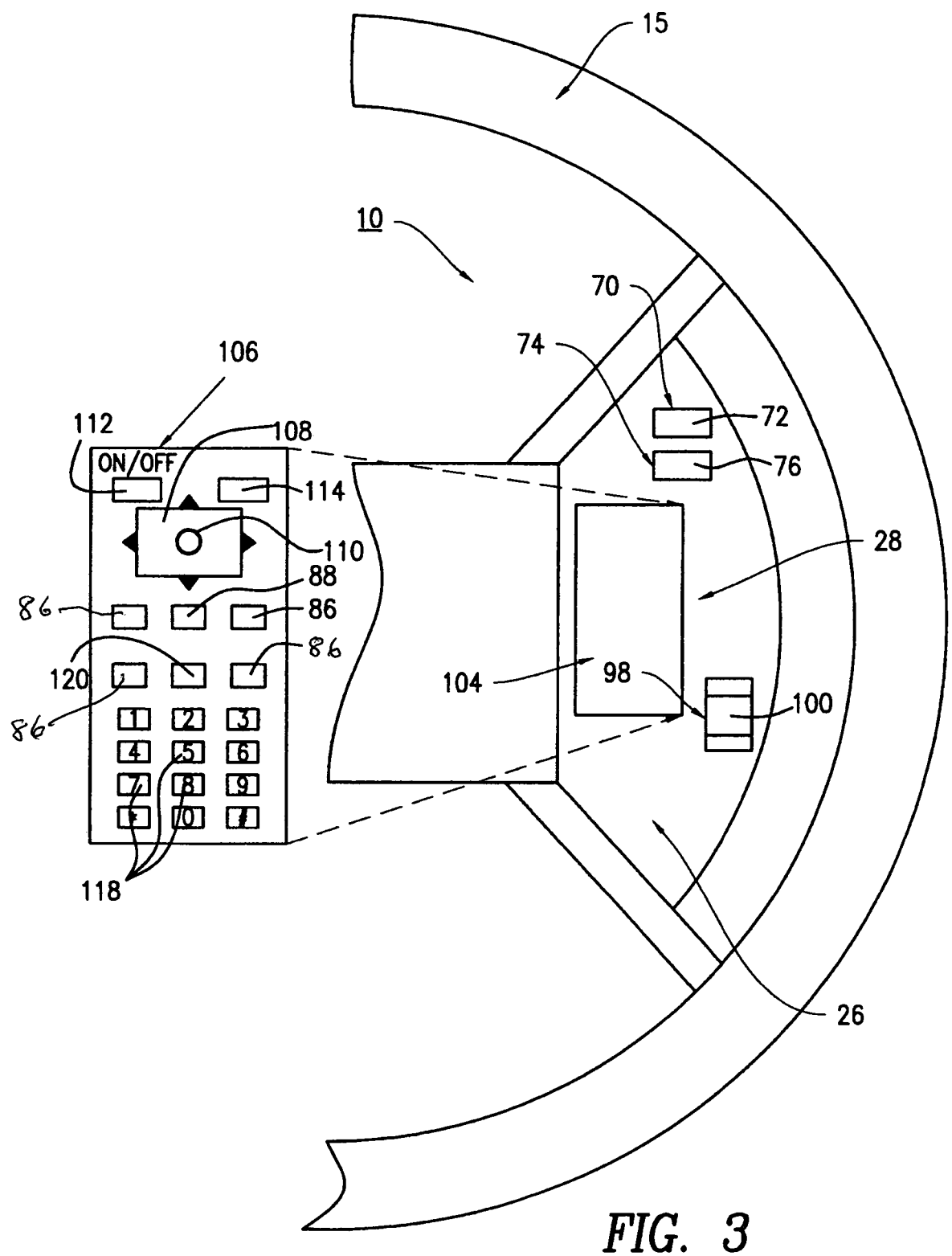
FIG. 3 is an exploded front view of the heads-up display adaptor unit of the present invention showing the heads-up display control member having a cursor control compartment for receiving a cursor control member therein.

The heads-up display control panel member 26, as shown in FIGS. 2 and 3, includes a first compartment 70 for receiving an adjustment control pad 72 therein for adjusting the size and focus of the heads-up display screen 24 of the vehicle's windshield 14; a second compartment 74 for receiving a speedometer gauge switch 76 therein for displaying the speedometer gauge 78 from the vehicle's dashboard 13 to the HUD screen 24 on the vehicle's windshield 14; and a third compartment 98 for receiving a volume control pad 100 therein for raising or lowering of the sound level of the vehicle's radio system 102 (CD, tape deck, video, cell phone, etc). The heads-up display control panel member 26 further includes a fourth compartment 104 for receiving a cursor control member 106 therein.

As shown in FIGS. 1, 2 and 3, the cursor control member 106 is used for controlling various functions used in the HUD unit 20. The cursor control member 106, as depicted in FIG. 3, includes function key buttons 86, a peripheral on/off button 88, a cursor control pad 108, an accept button 110, an HUD cursor control member on/off button 112, a menu button 114, a key pad 118, and a recording button 120. A recording chip for button 120 can be an additional feature for use with the vehicle's computer system 11. The cursor control member 106 can be detachably connected to the fourth compartment 104 of the HUD control panel member 26. The adjustment control pad 72 is mounted on the steering wheel 15, as shown in FIG. 3. The cursor control member 106 is detachably connected to steering wheel 15, as depicted in FIGS. 1 and 3 of the drawings. When detachable it can work wireless. It can also be a touch pad instead of a hard key pad.

OPERATION OF THE PRESENT INVENTION

In operation, as depicted in FIGS. 1 through 5 of the drawings, the HUD adaptor unit 10 operates in the following manner. When the vehicle operator turns on the HUD adaptor unit 10 from the on/off switch 112 on the steering wheel 15 or optionally by a passenger, the computer will recognize all the peripherals attached (hard and soft). At that point a menu showing all recognized peripherals will project on the HUD screen 24 and the operator, driver or passenger, will be able to command their desires using the cursor control member 106 in combination of one or more keys.

Referring to FIGS. 1 and 4, the first adaptor plug 58 at the proximal end 52 of the HUD adaptor unit 10A is received within the cell phone receiving port 60 of cell phone 40. The first adaptor plug 58 may be received within any number of different receiving ports 60 of different electronic peripherals, such as a hand-held computer, a palm pilot, an iPod, a personal display assistant (PDA) and the like which may be hooked up at the same time. In the next step, the second adaptor plug 62 at the distal end 54 of the HUD adaptor unit 10A is received within the USB receiving port 32a of the USB panel member 30. Next, the user selects the USB receiving port 32a using the control switch 108 and 110 in order to chose the cell phone 40 function. This selection then activates the heads-up display projector 22 to display the cell phone 40 screen image 40S on the HUD screen 24 on the front windshield 14 of vehicle 12, as shown in FIG. 2 of the drawings. Optionally, the user can adjust the adjustment control pad 72 for adjusting the size and focus of cell phone screen image 40S on the HUD screen 24 on windshield 14. Also, the user can make other adjustments using the cursor control member 106 for various cell phone 40 functions, such as making a phone call via key pad 118 and using function keys and buttons and the like. Although the cursor control pad 106 can control all the recognized peripherals, the peripherals can still be operated manually.

Alternatively, a PDA receiving port 60 of the PDA unit 50 may receive the first adaptor plug 58 of HUD adaptor 10B, as depicted in FIGS. 1 and 4. In such a case, the second adaptor plug 62 of HUD adaptor 10B is received within the USB receiving port 32b of USB panel member 30. Next, the user selects the USB receiving port 32b using the control switch 108 and 110 on HUD control panel member 26 in order to choose the PDA unit 50 function. This selection then activates the HUD projector 22 to display the PDA unit 50 screen image 50S on the HUD screen 24 on the front windshield 14 of vehicle 12.

It is understood the aforementioned steps can also be used for electrically connecting to other electronic peripherals, such as a laptop computer 42, an iPod 44, a TV set 46, a palm pilot 48, a GPS satellite receiver 84, a radio system 102 or a climate control system 94 and the like. It is also understood the car 12 can have many USB receiving ports 32, such that radios, CD's, and tape decks can be hard wired and assigned to a first USB port; climate controls can be hard wired and assigned to a second USB port; a GPS satellite receiver can be hard wired and assigned to a third USB port; cruise controls can be hard wired and assigned to a fourth USB port; side mirror, rear-view mirror and window controls can be hard wired and assigned to a fifth USB port, and so on to any other electronic peripherals.

The car computer and the HUD control panel member 26 have control key members 86, 88, 108, 110, 112, 114, 118, 120, and the HUD adaptor unit 10 are adapted to project various screens 24 of the peripheral electronic products being used onto a vehicle's windshield 14 such that the driver, for example when using a cell phone, can quickly and safely answer and hang-up the cell phone, access a list of cell phone numbers and then automatically call that specific phone number, access appointments, previous phone messages and phone numbers, e-mails, favorite songs and the like while keeping both hands on the steering wheel 15 of the vehicle 12 when driving or in a stationary mode.

It should be understood that vehicle 12 is capable of handling "bluetooth" technology. Bluetooth technology is cable-replacement technology, such that a bluetooth chip is designed to replace cables by taking the information normally carried by the cable, and transmitting it at a special frequency to a receiver bluetooth chip, which will then give the information received to the computer 11, cell phone 40, printer and other electronic devices.

It should be understood that vehicle 12 can have as many receiving ports as needed, with such ports being hard-wired for use with any fixed peripherals that include, for example, a car gauge, car radio, CD player, tape deck, climate control unit, GPS, cruise control, TV, DVD, side mirror and window controls, garage door openers, a fixed car cell phone, electronic cradle and the like which are internally wired to the vehicle's computer.

Vehicle 12 can also have as many receiving ports as needed that are made from soft external wiring for use with all portable peripherals such as a cell phone, palm pilot, ipod, TV, VCR, DVD, lap-top computer, printer, fax machine, recording devices or other peripherals that can be hooked up with a cable connection.

ADVANTAGES OF THE PRESENT INVENTION

Accordingly, an advantage of the present invention is that it provides for a portable heads-up display adaptor for use in conjunction with an existing vehicle heads-up display (HUD) unit, wherein the adaptor has plugged into it a cell phone, PDA, computer or other peripherals for displaying a cell phone message or other information on a screen on the vehicle's windshield, such that the driver may quickly and safely access the information while the driver is able to keep both hands on the steering wheel of the vehicle while driving using the portable HUD adaptor and software with the vehicle's existing HUD unit.

Another advantage of the present invention is that it provides for a HUD adaptor for use in conjunction with various peripherals such as an iPod, a laptop/hand held computer, a palm pilot, a PDA, a GPS satellite receiver, a CD player, a satellite radio, a beeper or other communication/electronic devices and the like.

Another advantage of the present invention is that it provides for a HUD adaptor that is capable of receiving and transmitting the data required from each of the electronic peripherals to the existing HUD unit and displaying the required information on the existing HUD screen on the vehicle's windshield using a HUD control unit on the steering wheel of the user's vehicle.

Another advantage of the present invention is that it provides for a HUD adaptor when in operational use is able to integrate portable peripherals to a vehicle.

Another advantage of the present invention is that it provides for a HUD adaptor that allows the replacement of many existing buttons in a vehicle and combining the controls on to a control pad and HUD system.

Another advantage of the present invention is that it provides for a HUD adaptor that allows for the elimination of bulky electronics and which allow for the replacement of inexpensive electronics within the computer processing board.

Another advantage of the present invention is that it provides for a HUD adaptor that will cause less accidents and lower insurance costs.

Another advantage of the present invention is that it provides for a HUD adaptor for use in combination with an existing HUD unit that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A heads-up display (HUD) adaptor for use in combination with an existing heads-up display (HUD) unit in a vehicle, wherein the HUD adaptor receives an electronic peripheral in order to display electronic data and information from the peripheral on the screen of the existing HUD unit on a vehicle's windshield, comprising:
   a) one or more HUD adaptors each having a proximal end, a distal end and a cable therebetween; said proximal end including a first adaptor plug; and said distal end including a second adaptor plug;
   b) an existing HUD unit including a heads-up display screen on a front windshield of the vehicle and further including a heads-up display control unit positioned within a control panel on a steering wheel or console of the vehicle for controlling each of the electronic peripherals;
   c) said HUD unit including a USB panel member having a plurality of USB receiving ports for connecting one or more of said HUD adaptors thereto;
   d) said first adaptor plug of said HUD adaptor being received within a receiving port of the electronic peripheral;
   e) said second adaptor plug of said HUD adaptor being received within one of said plurality of said USB receiving ports of said USB panel member for electronically connecting said HUD adaptor to said HUD control unit; and
   f) said HUD control unit for controlling said electronic peripheral to display electronic data or information therefrom on the screen of the HUD unit on the vehicle's windshield.

2. A HUD adaptor for use in combination with an existing HUD unit in accordance with claim 1, wherein said electronic peripherals includes cell phones, PUD, Palm pilot organizers, Global Positioning System (GPS), Ipod, radio, satellite radio, tape player, CD player, DVD player, laptop, printer, fax machine, digital camera, beepers, cruise control, side mirrors control, seat control, seat memory control, garage doors opener, recoding devices, climate controls, climate hover controls, internal security, alarms, tracking system, vehicle gage controls, door controls, window controls, defrost controls, interactive games, and other communication devices fixed or portable.

3. A HUD adaptor for use in combination with an existing HUD unit in accordance with claim 1, wherein said USB panel member includes a head-set microphone jack receiving port for receiving a head-set microphone jack cable of a head set therein.

4. A HUD adaptor for use in combination with an existing HUD unit in accordance with claim 1, wherein said HUD control unit includes a compartment for receiving an adjustment control pad therein for adjusting the size and focus of said HUD display screen on the vehicle's windshield.

5. A HUD adaptor for use in combination with an existing HUD unit in accordance with claim 1, wherein said HUD control unit includes a compartment for receiving a speedometer gauge switch therein for displaying a speedometer gauge from the vehicle's dashboard to said HUD screen on the vehicle's windshield.

6. A HUD adaptor for use in combination with an existing HUD unit in accordance with claim 1, wherein said HUD control unit includes a compartment for receiving a volume control pad therein for raising or lowering of the sound level of one of said electronic communication devices.

7. A HUD adaptor for use in combination with an existing HUD unit in accordance with claim 1, wherein said HUD control unit includes a compartment for receiving a cursor control member therein for controlling the various functions being used in said HUD unit.

8. A HUD adaptor for use in combination with an existing HUD unit in accordance with claim 7, wherein said cursor control member includes a power button, a menu button, a cursor control pad, an accept button, a peripheral on/off button, a recording button, functions keys, and a key pad for use with one of said electronic communication devices.

9. A HUD adaptor for use in combination with an existing HUD unit in accordance with claim 1, wherein each of said first and second adaptor plugs is an USB type of adaptor.

* * * * *